United States Patent [19]
Longmuir

[11] Patent Number: 5,868,063
[45] Date of Patent: Feb. 9, 1999

[54] CORN STEAMER DEVICE

[76] Inventor: Robert William Longmuir, 217 Redwood Ave., Trenton, N.J. 08610

[21] Appl. No.: 840,660

[22] Filed: Apr. 25, 1997

[51] Int. Cl.[6] .............................. A47J 27/04; A47J 37/00
[52] U.S. Cl. ................................. 99/417; 99/448; 99/450; 126/20; 126/369; 219/401
[58] Field of Search .............................. 99/339, 340, 357, 99/483, 403, 410–418, 448, 446, 450, 516, 331, 330; 126/369, 381, 20; 426/510, 511, 523; 219/401, 400, 391–393, 405, 411, 472, 438, 399

[56] References Cited

U.S. PATENT DOCUMENTS

| | | | |
|---|---|---|---|
| 4,013,869 | 3/1977 | Orts | 219/401 |
| 4,509,412 | 4/1985 | Whittenburg et al. | 99/331 |
| 5,189,947 | 3/1993 | Yim | 99/415 |
| 5,400,701 | 3/1995 | Sham | 99/410 |
| 5,552,577 | 9/1996 | Su | 219/401 |
| 5,584,235 | 12/1996 | DuBois et al. | 99/413 |
| 5,653,161 | 8/1997 | Nopanen et al. | 99/415 |

*Primary Examiner*—Timothy F. Simone

[57] ABSTRACT

A corn steamer device comprises a heater base having a generally hollow interior and an open top, the heater base being electrically powered and including heating devices to heat the interior of the base, the heater base having an on/off switch coupled to the heating devices, in an operative orientation the hollow interior of the heater base being filled with water; an elevation device to support ears of corn above the hollow interior of the heater base; and a cover being positionable over the open top of the heater base.

7 Claims, 3 Drawing Sheets

CORN STEAMER DEVICE

BACKGROUND OF THE INVENTION

1. Field of the Invention

The present invention relates to a corn steamer device and more particularly pertains to steam cooking corn cobs with a corn steamer device.

2. Description of the Prior Art

The use of corn cooking devices is known in the prior art. More specifically, corn cooking devices heretofore devised and utilized for the purpose of cooking corn are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,920,872 to Henry discloses an apparatus for cooking corn on the cob.

U.S. Pat. No. 5,199,347 to Chen discloses a perforated skin plate.

U.S. Pat. No. DES. 347,352 to Meyers discloses a vegetable fresh rice steamer.

U.S. Pat. No. DES. 336,727 to Skerker discloses a vegetable steamer.

U.S. Pat. No. 4,477,705 to Danley discloses a microwave oven popcorn popper, steamer and roaster.

U.S. Pat. No. 4,138,939 to Feld discloses a vegetable steamer.

While these devices fulfill their respective, particular objective and requirements, the aforementioned patents do not describe a corn steamer device for steam cooking corn cobs.

In this respect, the corn steamer device according to the present invention substantially departs from the conventional concepts and designs of the prior art, and in doing so provides an apparatus primarily developed for the purpose of steam cooking corn cobs.

Therefore, it can be appreciated that there exists a continuing need for new and improved corn steamer device which can be used for steam cooking corn cobs. In this regard, the present invention substantially fulfills this need.

SUMMARY OF THE INVENTION

In the view of the foregoing disadvantages inherent in the known types of corn cooking devices now present in the prior art, the present invention provides an improved corn steamer device. As such, the general purpose of the present invention, which will be described subsequently in greater detail, is to provide a new and improved corn steamer device and method which has all the advantages of the prior art and none of the disadvantages.

To attain this, the present invention essentially comprises a new and improved corn steamer device comprising, in combination: a heater base formed in a generally rectangular configuration with four upstanding side walls, an open top and a generally hollow interior, the heater base including a plurality of elastomeric feet to facilitate secure positioning on a mounting surface, the heater base being electrically powered and including heating means to heat the interior of the base, an electric cord being operatively coupled to the heating means and including an electrical plug adapted to be coupled within a conventional household electrical outlet, the heater base including an on/off switch operatively coupled to the heating means and electrical cord, in an operative orientation the hollow interior of the heater base being filled with water; a collapsible tray including a lower plate and first and second upper plates, the lower plate being formed as a contiguous piece with a plurality of generally rectangular shaped apertures extending therethrough, each upper plate having one-half the width of the lower plate and including a plurality of rectangular apertures extending therethrough, each upper plate having four hinged legs extending therefrom, the hinged legs being positionable in an extended orientation and a collapsed orientation, when in the extended orientation the apertures of the upper plate being positioned in alignment with the apertures of the lower plate, in an operative orientation the collapsible tray being positioned within the hollow interior of heater base with the legs of the upper trays in an extended orientation, at least one ear of corn being placed upon the upper plates of the collapsible tray; a cover including a rounded upper section and a rectangular lower section, the lower section adapted to be placed upon the walls of the base, the upper section of the cover including four upwardly angled rounded side walls, each side wall having upper extent and lower extent, the upper extent of each side wall having a smaller diameter than the lower extent with a gradually increasing diameter therebetween, the central portion of the upper section being flat and shaped in a rectangular configuration, the flat central portion having a plurality of vent holes extending therethrough; and a vent cap formed in a generally semi-cylindrical configuration with a flat lower end and a rounded upper end, the vent cap being pivotally coupled over the flat central portion of the upper section of the cover by a hinge, a handle formed in a generally C-shaped configuration being affixed to the rounded upper extent of the vent cap.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved corn steamer device which has all the advantages of the prior art corn cooking devices and none of the disadvantages.

It is another object of the present invention to provide a new and improved corn steamer device which may be easily and efficiently manufactured and marketed.

It is a further object of the present invention to provide a new and improved corn steamer device which is of durable and reliable construction.

An even further object of the present invention is to provide a new and improved corn steamer device which is susceptible of a low cost of manufacture with regard to both materials and labor, and which accordingly is then susceptible of low prices of sale to the consuming public, thereby making such a corn steamer device economically available to the buying public.

Still yet another object of the present invention is to provide a new and improved corn steamer device which provides in the apparatuses and methods of the prior art some of the advantages thereof, while simultaneously overcoming some of the disadvantages normally associated therewith.

Even still another object of the present invention is to provide a new and improved corn steamer device for steam cooking corn cobs.

Lastly, it is an object of the present invention to provide a new and improved corn steamer device a corn steamer device comprising: a heater base having a generally hollow interior and an open top, the heater base being electrically powered and including heating means to heat the interior of the base, the heater base having an on/off switch coupled to the heating means, in an operative orientation the hollow interior of the heater base being filled with water; an elevation device to support ears of corn above the hollow interior of the heater base; and a cover being positionable over the open top of the heater base.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
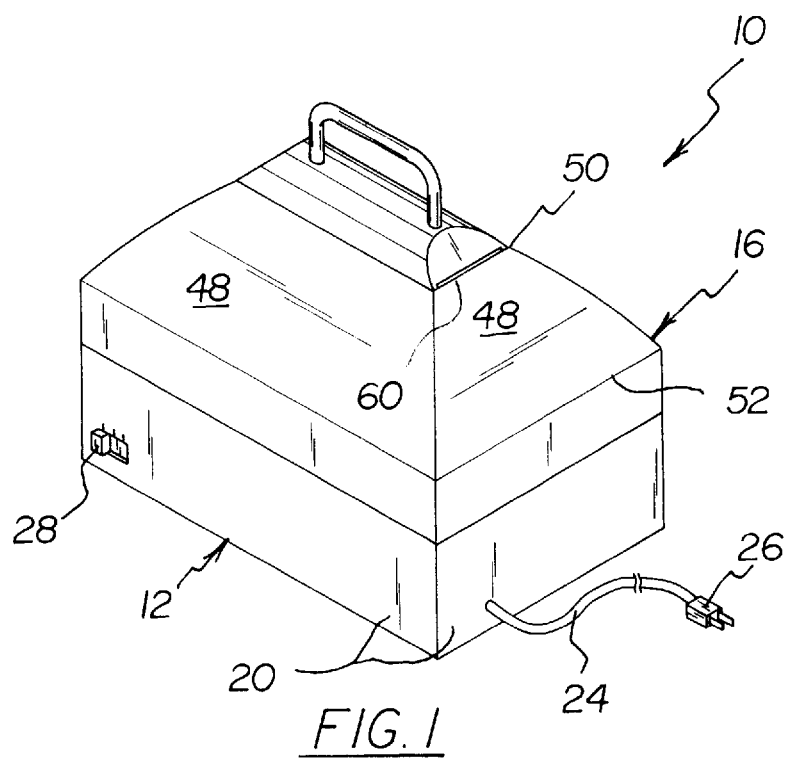
FIG. 1 is a perspective view of the preferred embodiment of the corn steamer device constructed in accordance with the principles of the present invention.

With reference now to the drawings, and in particular, to FIG. 1 thereof, the preferred embodiment of the new and improved corn steamer device embodying the principles and concepts of the present invention and generally designated by the reference number 10 will be described.

Specifically, it will be noted in the various Figures that the device relates to a corn steamer device 10 for steam cooking corn cobs. In its broadest context, the device consists of a heater base 12, a collapsible tray 14 and a cover 16. Such components are individually configured and correlated with respect to each other so as to attain the desired objective.

The heater base 12 is formed in a generally rectangular configuration with four upstanding side walls 20, an open top and a generally hollow interior. The heater base is eleven inches long and seven inches wide. The heater base includes a plurality of elastomeric feet 22 to facilitate secure positioning on a mounting surface. The feet are fabricated of rubber in the preferred embodiment. The heater base is electrically powered and includes heating means to heat the interior of the base. In one embodiment the heater means consist of a plurality of heater coils. Note FIG. 1.

Figure 2:
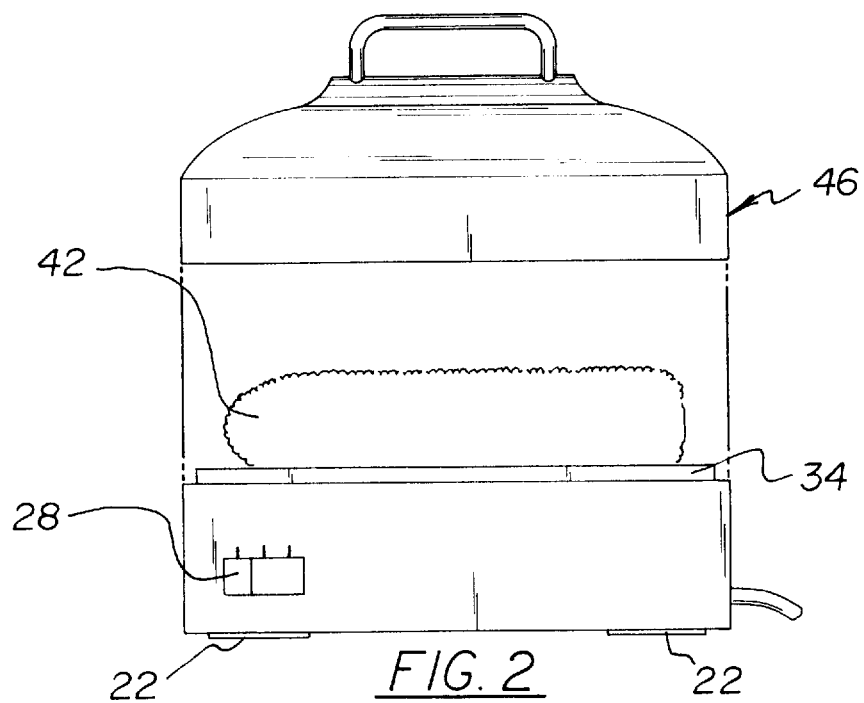
FIG. 2 is a separated perspective view illustrating the positioning of the cover upon the heater base of the apparatus.

An electric cord 24 is operatively coupled to the heating means and includes an electrical plug 26 adapted to be coupled within a conventional household electrical outlet. The heater base includes an on/off switch 28 operatively coupled to the heating means and electrical cord. In the preferred embodiment the on/off switch is positioned adjacent to a corner of the heater base. In an operative orientation the hollow interior of the heater base is filled with water. The heating means is capable of generating enough heat to raise the water temperature to 100 degrees Celsius whereupon the water will be converted to steam. Note FIG. 2.

Figure 5:
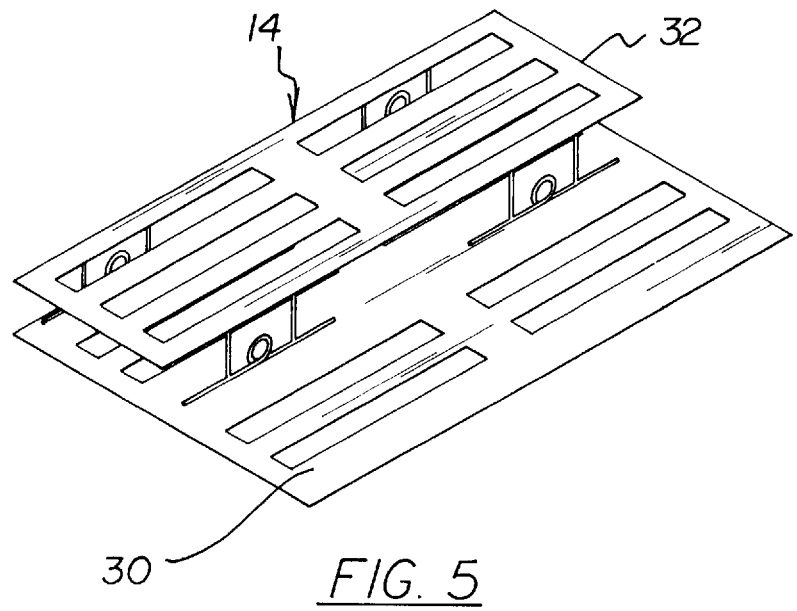
FIGS. 5 and 6 are perspective views of collapsible tray of the apparatus.
Figure 6:
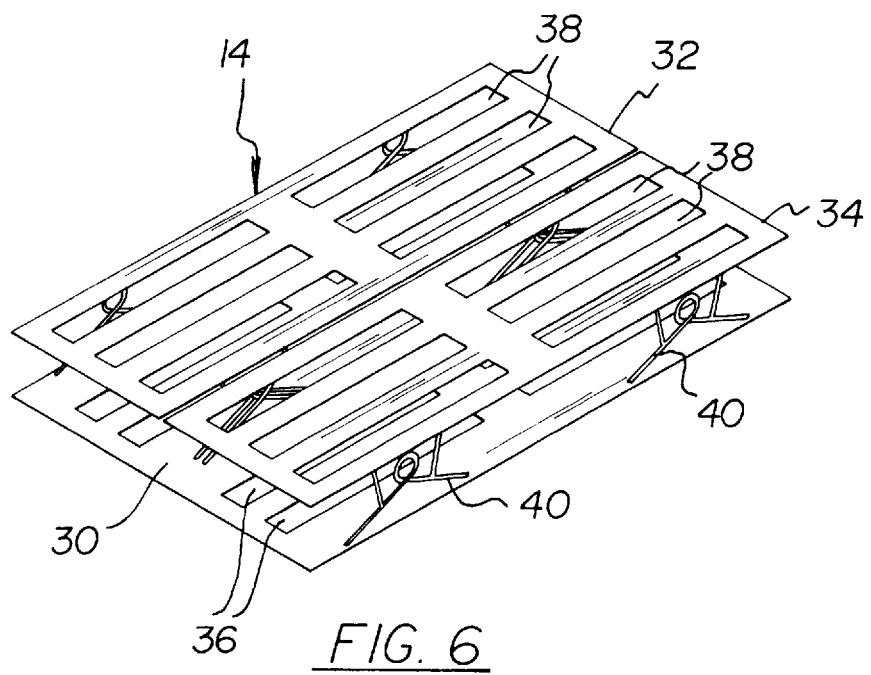

The collapsible tray 14 includes a lower plate 30 and first 32 and second 34 upper plates. The lower plate is formed as a contiguous piece with a plurality of generally rectangular shaped apertures 36 extending through it. Each upper plate has one-half the width of the lower plate and also includes a plurality of rectangular apertures 38 extending through it. Each upper plate has four hinged legs 40 extending from it. The hinged legs are positionable in an extended orientation and a collapsed orientation. When in the extended orientation the upper plates are positioned on top of the lower plates with the apertures of the upper plates in alignment with the apertures of the lower plate. This configuration permits the free flow of steam through the apertures to evenly cook corn cobs. Note FIGS. 2, 5 and 6.

Figure 3:
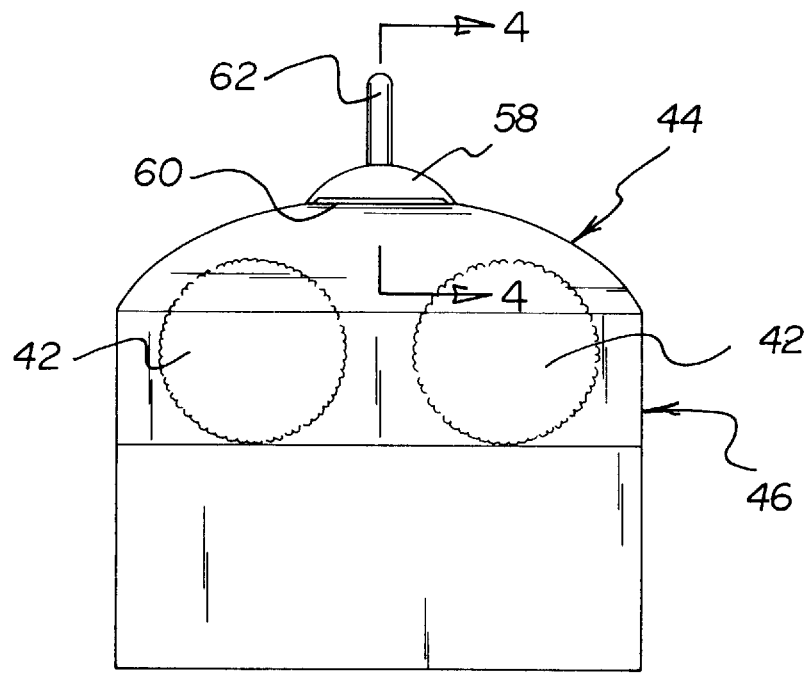
FIG. 3 is a partially broken away end perspective view illustrating the positioning of corn cobs the apparatus.

In an operative orientation the collapsible tray is positioned within the hollow interior of heater base with the legs of the upper trays in an extended orientation. One or both trays may be utilized. Note FIGS. 5 and 6. At least one ear of corn 42 is placed upon the upper plates 32, 34 of the collapsible tray. The tray serves to elevate the corn above the water in the heater base so that the corn will be cooked by steam as opposed to being boiled in water. The tray is placed in the collapsed orientation when storage of the apparatus is required. Note FIG. 3.

Figure 4:
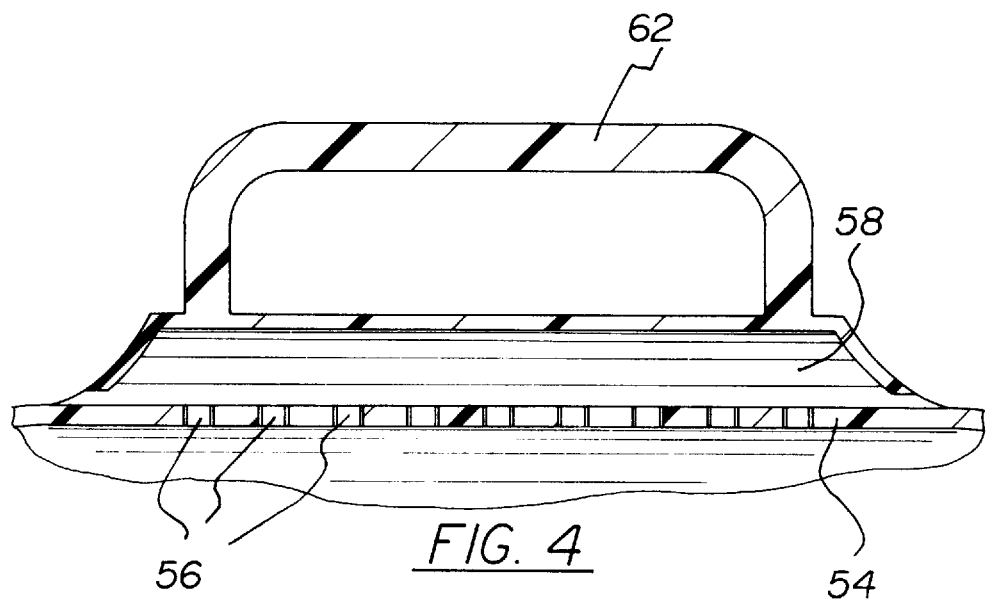
FIG. 4 is a cross sectional view of the vent holes and handle of the apparatus taken along section line 4—4 of FIG. 3.

A cover 16 includes a rounded upper section 44 and a rectangular lower section 46. The lower section is adapted to be placed upon the walls of the base to cover the open top thereby causing recirculation of steam. The upper section of the cover includes four upwardly angled rounded side walls 48. Each side wall has an upper extent 50 and lower extent 52. The upper extent of each side wall has a smaller diameter than the lower extent with a gradually increasing diameter therebetween. The central portion 54 of the upper section is flat and shaped in a rectangular configuration. The flat central portion has a plurality of vent holes 56 extending through it. Note FIG. 4.

A vent cap 58 is formed in a generally semi-cylindrical configuration with a flat lower end and a rounded upper end. The vent cap is pivotally coupled over the flat central portion of the upper section of the cover by a hinge 60. A handle 62 formed in a generally C-shaped configuration is affixed to the rounded upper extent of the vent cap. The vent cap is opened intermittently during cooking to relieve excessive steam pressure build up within the apparatus. Note FIGS. 3 and 4.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved corn steamer device comprising, in combination:

a heater base formed in a generally rectangular configuration with four upstanding side walls, an open top and a generally hollow interior, the heater base including a plurality of elastomeric feet to facilitate secure positioning on a mounting surface, the heater base being electrically powered and including heating means to heat the interior of the base, an electric cord being operatively coupled to the heating means and including an electrical plug adapted to be coupled within a conventional household electrical outlet, the heater base including a switch operatively coupled to the heating means and electrical cord, in an operative orientation the hollow interior of the heater base being filled with water;

a collapsible tray including a lower plate and first and second upper plates, the lower plate being formed as a contiguous piece with a plurality of generally rectangular shaped apertures extending therethrough, each upper plate having one-half the width of the lower plate and including a plurality of rectangular apertures extending therethrough, each upper plate having four hinged legs extending therefrom, the hinged legs being positionable in an extended orientation and a collapsed orientation, when in the extended orientation the apertures of the upper plate being positioned in alignment with the apertures of the lower plate, in an operative orientation the collapsible tray being positioned within the hollow interior of heater base with the legs of the upper trays in an extended orientation, at least one ear of corn being placed upon the upper plates of the collapsible tray;

a cover including a rounded upper section and a rectangular lower section, the lower section adapted to be placed upon the walls of the base, the upper section of the cover including four upwardly angled rounded side walls, each side wall having upper extent and lower extent, the upper extent of each side wall having a smaller diameter than the lower extent with a gradually increasing diameter therebetween, the central portion of the upper section being flat and shaped in a rectangular configuration, the flat central portion having a plurality of vent holes extending therethrough; and a vent cap formed in a generally semi-cylindrical configuration with a flat lower end and a rounded upper end, the vent cap being pivotally coupled over the flat central portion of the upper section of the cover by a hinge, a handle formed in a generally C-shaped configuration being affixed to the rounded upper extent of the vent cap.

2. A corn steamer device comprising:

a heater base having a generally hollow interior and an open top, the heater base being electrically powered and including heating means to heat the interior of the base, the heater base having a switch coupled to the heating means, in an operative orientation the hollow interior of the heater base being filled with water;

an elevation device to support ears of corn above the hollow interior of the heater base; and a cover being positionable over the open top of the heater bases wherein the cover has a rounded upper section and a rectangular lower section, the lower section adapted to be positioned upon the heater base over its open top, the upper section of the cover including four upwardly angled rounded side walls, each side wall having an upper extent and lower extent, the upper extent of each side wall having a smaller diameter than the lower extent with a gradually increasing diameter therebetween, the cover having a flat central portion shaped in a rectangular configuration, the flat central portion having a plurality of vent holes extending therethrough.

3. The corn steamer device as set forth in claim 2 and further including:

a vent cap formed in a generally semi-cylindrical configuration with a flat lower end and a rounded upper end, the vent cap being pivotally coupled over the flat central portion of the upper section of the cover by a hinge, a handle formed in a generally C-shaped configuration being affixed to the rounded upper extent of the vent cap.

4. The corn steamer device as set forth in claim 2 and further including:

a vent cap removably coupled over the central portion of the cover.

5. The corn steamer device as set forth in claim 2 wherein an electric cord is operatively coupled to the heating means and includes an electrical plug adapted to be coupled within a conventional household electrical outlet.

6. The corn steamer device as set forth in claim 2 wherein the heater base includes a plurality of elastomeric feet to facilitate secure positioning on a mounting surface.

7. A corn steamer device comprising:

a heater base having a generally hollow interior and an open top, the heater base being electrically powered and including heating means to heat the interior of the base, the heater base having a switch coupled to the heating means, in an operative orientation the hollow interior of the heater base being filled with water;

an elevation device to support ears of corn above the hollow interior of the heater base; and a cover being positionable over the open top of the heater base;

wherein the elevation device is a collapsible tray including a lower plate and first and second upper plates, the lower plate being formed as a contiguous piece with a plurality of generally rectangular shaped apertures extending therethrough, each upper plate having one-half the width of the lower plate and including a plurality of rectangular apertures extending therethrough, each upper plate having four hinged legs extending therefrom, the hinged legs being positionable in an extended orientation and a collapsed orientation, when in the extended orientation the apertures of the upper plate being positioned in alignment with the apertures of the lower plate, in an operative orientation the collapsible tray being positioned within the hollow interior of the heater base with the legs of the upper trays in an extended orientation, at least one ear of corn being placed upon the upper plates of the collapsible tray.

* * * * *